United States Patent [19]

Maruzeni et al.

[11] Patent Number: 4,613,514

[45] Date of Patent: Sep. 23, 1986

[54] CACAO BUTTER SUBSTITUTES AND CHOCOLATES CONTAINING THE SAME

[75] Inventors: Shoji Maruzeni; Toshimichi Yanagihara; Nozomi Yasuda, all of Tokyo, Japan

[73] Assignee: Asahi Denka Kogyo Kabushiki Kaisha, Tokyo, Japan

[21] Appl. No.: 624,336

[22] Filed: Jun. 25, 1984

[30] Foreign Application Priority Data

Jun. 29, 1983 [JP] Japan .................................. 58-117701
Apr. 13, 1984 [JP] Japan .................................. 59-74254

[51] Int. Cl.⁴ ........................... A23D 5/00; A23G 1/00
[52] U.S. Cl. ..................................... 426/607; 426/613; 426/660
[58] Field of Search ............... 426/607, 613, 660, 429, 426/479, 495

[56] References Cited

U.S. PATENT DOCUMENTS

| | | | |
|---|---|---|---|
| 2,975,060 | 3/1961 | Best et al. | 426/607 |
| 3,093,480 | 6/1963 | Arnold | 426/607 X |
| 4,103,039 | 7/1978 | Mandai et al. | 426/607 |
| 4,199,611 | 4/1980 | Toyoshima et al. | 426/607 |
| 4,219,584 | 8/1980 | Mori et al. | 426/607 |
| 4,465,703 | 8/1984 | Jasko et al. | 426/607 |

Primary Examiner—Robert Yoncoskie
Attorney, Agent, or Firm—Birch, Stewart, Kolasch & Birch

[57] ABSTRACT

A cacao butter substitute is disclosed having a medium melting point fraction of palm oil, having a solid fat content of 70% or more at 20° C., 10% or more at 30° C., 1% or less at 33° C. and 0% at 35° C., and showing an initial curve in cooling curve which is identical down to 19° C. to the initial curve of a palm soft oil having an iodine value of 65 or above in which the medium melting point fraction is removed and the high melting point fraction is completely removed. The cacao butter substitute has very sharp melting characteristics and excellent compatibility with cacao fat.

8 Claims, 7 Drawing Figures

CACAO BUTTER SUBSTITUTES AND CHOCOLATES CONTAINING THE SAME

BACKGROUND OF THE INVENTION (1) Field of the Invention

This invention relates to cacao butter substitutes. More particularly, the present invention relates to cacao butter substitutes having very sharp melting characteristics as well as to chocolates containing said cacao butter substitutes.

(2) Description of the Prior Art

Cacao fat has been conventionally used as an oil and fat for chocolate. Unlike other natural or processed oils and fats, cacao fat has the unique characteristic of being a solid at or around the normal temperature but melting quite rapidly at or around body temperatures. This melting characteristic of cacao fat depends upon its very simple triglycerides composition which is composed substantially of 1,3-disaturated-2-unsaturated triglycerides (SUS) comprising 1-(3-)palmito-2-oleo-3-(1-)stearin (POS) as a main component.

An absolute requirement for cacao butter substitutes is that they have physical properties, particularly melting characteristics similar to that of cacao fat. For allowing a cacao butter substitute to have physical properties similar to those of cacao fat, there are two basic methods viewed from the compositional standpoint. In one method, a cacao butter substitute is allowed to have a triglyceride structure similar to that of cacao fat. If the cacao butter substitute has a similar triglyceride structure, this eventually gives physical properties similar to those of cacao fat. In the other method, a cacao butter substitute having a triglyceride structure largely different from that of cacao fat is allowed to be similar to cacao fat in its physical properties, particularly in its own melting characteristic. Hereinafter, the former cacao butter substitute is called a similar structure type substitute and the latter cacao butter substitute a dissimilar structure type substitute, from their similarities to cacao fat in triglyceride structure. The dissimilar structure type substitutes are further divided into laurin type substitutes and trans type substitutes. The laurin type substitutes are produced by processing a laurin type oil and fat such as palm oil, palm-kernel oil or the like, and the trans type substitutes are produced by processing a very common vegetable oil such as soybean oil, rice oil, cotton seed oil, rape seed oil, corn oil or the like, particularly by subjecting the oil to a process essentially comprising a hydrogenation step (in this hydrogenation, the trans acid group is inevitably formed).

Cacao butter substitutes are also divided into two types according to processes in which they are used for the production of chocolates. One type is tempering type substitutes which can be produced into chocolates by a process requiring a tempering step. Another type is non-tempering type substitutes which can be produced into chocolates by a process not requiring a tempering step. The tempering type substitutes correspond to the similar structure type substitutes and the non-tempering type substitutes to the dissimilar structure type substitutes.

The conventional similar structure type substitutes have hitherto been studied and developed with a definite objective of allowing them to have structures and physical properties, particularly melting characteristics as similar as possible to that of cacao fat. They are used mainly in plate type chocolates of high quality.

On the other hand, the dissimilar structure type substitutes have a variety of applications as a material for composite cakes, and accordingly various products using these substitutes have been developed. Of the dissimilar structure type substitutes, laurin type substitutes are especially noteworthy.

The laurin type substitues are produced by subjecting an oil and fat material whose major constituent is the laurin acid group, such as palm oil, palm-kernel oil, babassu oil or the like and to a combination of hydrogenation, ester group exchange, solvent fractionation and the like. Compared with other cacao butter substitutes, laurin type substitutes are very desirable because the laurin type substitutes have very rapidly melting characteristics, fast drying properties, appropriate heat resistances and very good snapping properties. However, being the dissimilar structure type substitutes, the laurin type substitutes have very poor compatibillity with cacao butter. The similar structure type substitutes of good quality are miscible with cacao fat in various proportions without showing little change in melting characteristics and crystal characteristic, while the dissimilar structure type have a limitation in miscibility with cacao fat. Mixing of cacao fat in an amount exceeding the limitation causes a sudden change in melting characteristic and crystal characteristic, and chocolate production becomes impossible. The flavor of chocolates is based on the flavor of cacao, therefore, if cacao fat can not be used beyond a low addition range, production of a chocolate of good flavor becomes impossible. Another detrimental drawback of the laurin type substitutes is their hydrolyzability. The hydrolyzability of the laurin type substitutes can not be reduced in spite of various contrivances being applied in their processing. Chocolates produced with the laurin type substitutes wherein hydrolysis has taken place give an unpleasant odor derived from medium chain fatty acids and may cause a nauseated feeling. Hence, use of the laurin type substitutes are restricted to the production of chocolates for use in cakes of short shelf life and can not be used in chocolate products of long shelf life, which is a big drawback for the laurin type substitutes.

SUMMARY OF THE INVENTION

In order to develop a cacao butter substitute having very excellent physical properties as possessed by the laurin type substitutes but not having drawbacks of the laurin type substitutes, the present inventors conducted extensive studies wherein various oil and fat materials and various processing steps were combined to prepare various oil and fat compositions and then each composition was subjected to analysis of composition, physical property, etc. As a result, the cacao butter substitutes of the present invention have been invented.

An object of the present invention is to provide cacao butter substitutes having physical properties similar to those of the laurin type substitutes but free from drawbacks of the laurin type substitutes.

Another object of the present invention is to provide chocolates which melt very sharply.

The cacao butter substitutes according to the present invention are close to the laurin type substitutes which are one of the dissimilar structure type substitutes, from the physical properties standpoint, but belong to the similar structure type substitutes from the compositional standpoint. Consequently, the cacao butter substitutes of the present invention have excellent miscibility with cacao fat and moreover cause no hydrolysis.

The cacao butter substitutes of the present invention are characterized by (a) comprising a medium melting point fraction of palm oil, (b) having a solid fat content of 70% or more at 20° C., 10% or more at 30° C., 1% or less at 33° C. and 0% at 35° C., and (c) showing an initial curve in the cooling which is identical to the initial curve of a liquid oil down to 19° C.

Preferable cacao butter substitutes of the present invention are characterized by satisfying the above requirements and further having a solid fat content of 80% or more at 20° C., 20% or more at 30° C. and 0% at 33° C.

Also, preferable cacao butter substitutes of the present invention are characterized by satisfying the above requirements and further showing an initial curve in the cooling curve which is identical to the initial curve of a liquid oil down to 17° C.

DETAILED DESCRIPTION OF THE INVENTION

Firstly, the cacao butter substitutes of the present invention are characterized by comprising a medium melting point fraction of palm oil. Accordingly, their fatty acid portion consists of (a) saturated fatty acid groups which substantially are palmitic acid group and stearic acid group and (b) unsaturated fatty acid groups which substantially are oleic acid group and linoleic acid group, and these cacao butter substitutes belong to the similar structure type substitutes.

Further, the cacao butter substitues of the present invention are characterized by having a solid fat content of 70% or more at 20° C., 10% or more at 30° C., 1% or less at 33° C. and 0% at 35° C. This solid fat content is very small at higher temperatures, namely, at 33° C. and 35° C., compared with those of the hitherto known similar structure type cacao butter substiutes.

Furthermore, the cacao butter substitutes of the present invention are characterized by showing an initial curve in the cooling curve which is identical to the initial curve of a liquid oil down to 19° C. As the liquid oil as a comparative oil, any liquid oil can be used if no crystal is separated out when the liquid oil is placed under the condition of cooling curve measurement mentioned below. Desirable as a standard liquid oil is a palm soft oil having an iodine value of 65 or above in which the medium melting point fraction is removed and high melting point fraction is completely removed.

The characteristic of the cacao butter substitutes of the present invention that the initial curve in the cooling curve is identical to that of a liquid oil down to 19° C. implies that the cacao butter substitutes of the present invention contain a very small amount of components which are easily crystallized under the condition of cooling curve measurement, compared with the hitherto known similar structure type cacao butter substitutes. That is to say, the cacao butter substitutes of the present invention can be easily supercooled.

Preferably, the cacao butter substitutes of the present invention have a solid fat content of 80% or more at 20° C., 20% or more at 30° C. and 0% at 33° C. and show an initial curve in the cooling curve which is identical to the initial curve of a liquid oil down to 17° C.

None of the hitherto known similar structure type cacao butter substitutes would have a solid fat content of 0% at 33° C. The cacao butter substitutes of the present invention can be used to produce sharply melting chocolates. This sharply melting characteristic becomes more conspicuous when a cacao butter substitute of the present invention is used in an amount of 60% by weight or more relative to the total amount of cacao butter and cacao butter substitute in chocolate.

In the present invention, solid fat content (SFC) was measured by the use of PRAXIS MODEL SFC-900 in accordance with the usual method (A.O.C.S. Recommended Practice Cd 16-81 Solid Fat Content), after preliminary treatment of an oil and fat to be measured. The preliminary treatment was conducted by repeating 7 times a sequence of completely liquefying a test oil and fat, allowing it to stand for 30 min. at 0° C. to solidify, allowing it to stand for 2 hr. at 20° C., and then allowing it to stand for 1 hr. at 30° C. and 2 hr. at 20° C. SFC was measured at temperatures of 10° C., 20° C., 25° C., 30° C., 33° C., 35° C. and 37° C.

Figure 1:
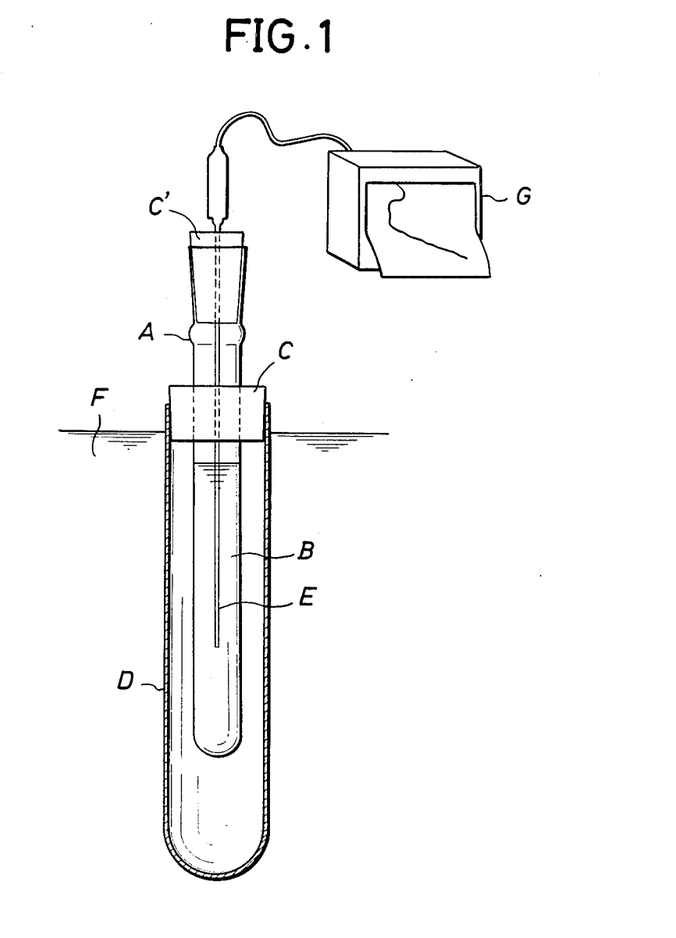
FIG. 1 is a schematic view of an apparatus used for measurement of the cooling curve of a cacao butter substitute of the present invention.

The cooling curve was measured by the use of an apparatus shown in FIG. 1, according to the following method.

In an inner glass tube A of 17 mm outside diameter, 1 mm thickness and 165 mm height is placed 12 g of an oil and fat B completely melted. After they have been left standing for 30 min. at 50° C., the tube A is inserted into an outer glass tube D of 32 mm outside diameter, 1 mm thickness and 155 mm height and of room temperature and is fixed to the tube D at the latter's neck portion via a rubber stopper C. Then, a thermistor E of 1.5 mm outside diameter is inserted into the tube A so that the thermistor is immersed in the oil and fat up to a depth of about 60 mm and is fixed to the tube A at the latter's neck portion via a rubber stopper C'. The thus prepared double glass tube is immersed in a constant temperature bath F of 12° C. to a depth of 145 mm. In this condition, a cooling curve of the oil and fat B is measured by the use of an automatic temperature recorder G, wherein a time at which the oil and fat B has a temperature of 40° C. is taken as zero cooling time.

In FIG. 1, the distance between the bottom of the inner tube A and the bottom of the outer tube D is about 40 mm, and the distance between the lower end of the thermistor E and the bottom of the inner tube A is about 35 mm.

Figure 2:
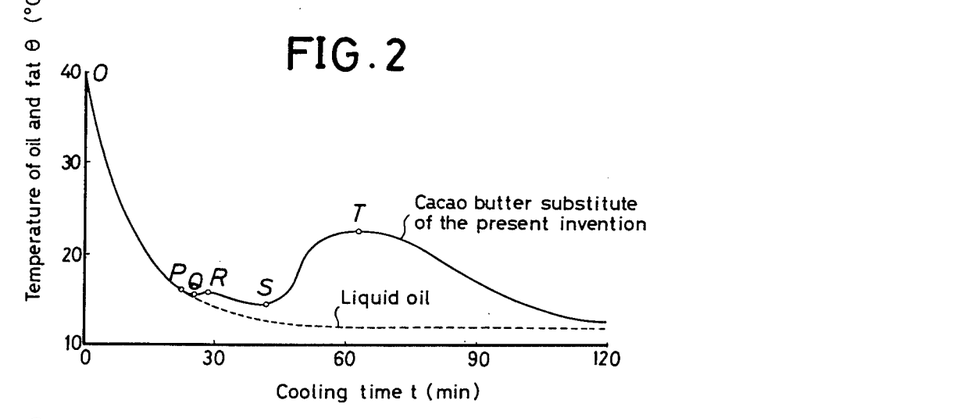
FIG. 2 is a graph showing cooling curves of a typical cacao butter substitute of the present invention and a liquid oil.

In FIG. 2, there are shown cooling curves measured according to the above mentioned method. As shown in FIG. 2, cooling curves were standardized by taking a time at which the temperature $\theta$ of an oil and fat came down to 40° C., as zero cooling time (min.). In FIG. 2, the dotted line is a cooling curve of a liquid oil and the solid line is a cooling curve of a typical cacao butter substitute of the present invention. As is obvious from FIG. 2, the cooling curve of the liquid oil comes down monotonously and the temperature becomes identical to that of the constant temperature water bath (12° C.) at a cooling time of about 80 min. In the cooling curve of the typical cacao butter substitute of the present invention, the curve declines monotonously and is identical to the curve of the liquid oil from point 0 (t=0.0 min., $\theta$=40.0° C.) to point P (20.2 min., 16.0° C.); the curve shows a temperature change (d$\theta$/dt) of 0 at point Q (22.3 min., 15.5° C.); the curve rises slightly and again, at point R (28.5 min., 15.8° C.), the temperature change becomes 0; then the curve continues to decline and, at point S (41.5 min., 14.4° C.), the temperature change becomes 0; and then the curve rises and, at point T (63.3 min., 22.5° C.), the temperature change becomes 0; and thereafter the curve continues to decline monotonously until the temperature of the cacao butter substitute reaches 12° C. In the present specification, the initial curve in cooling curve is defined as a section of cooling curve starting from point 0 (0.0 min., 40.0° C.) and showing a monotonous decline, namely, a section of cooling curve from point 0 (0.0 min., 40.0° C.) to a point showing a first sudden temperature change (d$\theta$/dt), in other words, a point at which temperature changes becomes 0 or close to 0 and which is point Q in the case of the cacao butter substitute of the present invention in FIG. 2. In the initial curve in the cooling curve of the cacao butter substitute of the present invention shown in FIG. 2, the section which is identical to that of the liquid oil is from point 0 (0.0 min., 40.0° C.) to point P. In FIG. 2, the temperature of point P, namely $\theta$p is 16.0° C. and accordingly the initial curve of the cacao butter substitute of the present invention can be regarded to be identical to that of the liquid oil down to 16° C. Hereinafter, the lowest temperature point of the initial curve of an oil and fat identical to the initial curve of a liquid oil is represented as point P. Some oils and fats show cooling curves slightly different from that of the cacao butter substitute of the present invention shown in FIG. 2. In one example of such cooling curves, there is no small peak like point R and there is only one large peak, where there is neither point Q nor point R. In this case, it may be viewed that points Q and S are identical and further points R and T are identical.

However, point P does exist clearly. In another example, there occurs a sudden change of temperature in a section of initial curve but this temperature in change (d$\theta$/dt) is not so large as to form a peak and is called a shoulder. The temperature change (d$\theta$/dt) around the shoulder is 0 or close to 0. In this case, it may be viewed that a point around the shoulder showing a temperature change (d$\theta$/dt) closest to 0 is identical to point Q and also to point R. In this case, the initial curve of an oil and fat is identical to that of a liquid oil down to its shoulder and the point P can be defined clearly. Thus, a cooling curve of an oil and fat can be clearly given by the co-ordinates of points P, Q, R, S and T. As another parameter for cooling curve which is often used, there is an absolute value of a difference between $\theta$s (a temperature of point S) and $\theta$t (a temperature of point T), namely, $\Delta\theta$st. However, this value can easily be derived fom the co-ordinates of the above respective points.

The cacao butter substitutes of the present invention are characterized by containing a fatty acid portion consisting of (a) saturated fatty acid groups which substantially ar palmitic acid group and stearic acid group and (b) unsaturated fatty acid groups which substantially are oleic acid group and linoleic acid group. Further, because the cacao butter substitutes of the present invention comprise a medium melting point fraction of palm oil, the proportion of palmitic acid group in the above saturated fatty acid groups is very large. This gives a more sharply melting property than the conventional similar structure type substitutes.

The cacao butter substitutes of the present invention are also characterized by having a solid fat content of 70% or more at 20° C., 10% or more at 30° C., 1% or less at 33° C. and 0% at 35° C. When the solid fat content at 20° C. of a cacao butter substitute is less than 70%, a chocolate using the cacao butter substitute can not retain the shape at room temperature and has an inferior snapping property. A preferable solid fat content at 20° C. is 80% or more. Also when the solid fat content at 30° C. is less than 10%, a chocolate can not retain the shape and has an inferior snapping property. A preferable solid fat content at 30° C. is 20% or more. When the solid fat content at 33° C. exceeds 1%, tempering procedure for chocolate becomes difficult. This problem becomes conspicuous particularly when the solid fat content at 35° C. is not 0%. Tempering procedure of chocolate becomes difficult particularly when a cocao butter substitute comprising a palm medium melting point fraction having a solid fat content exceeding 1% at 33° C. or a solid fat content of more than 0% at 35° C. is used in a large amount in a chocolate. Preferably, the solid fat content at 33° C. is 0%. When the solid fat content at 33° C. is 0%, tempering procedure of chocolate is very easy.

The cacao butter substitutes of the present invention are also characterized by showing an initial curve in cooling curve which is identical to the initial cooling profile of a liquid oil down to 19° C. That is, in FIG. 2, the temperature of point P, namely, $\theta$p is 19° C. or below. As is obvious from the definition of solid fat content, the cacao butter substitutes of the present invention are obtained by removing from a palm medium melting point fraction a high melting point fraction portion as completely as possible. The presence of a very small amount of a high melting point fraction gives a bad effect on tempering procedure of chocolate and makes the procedure difficult. There is a case that such a very small amount of a high melting point fraction can not be detected by measurement of solid fat content. As a result of studies on various oil and fat formulations, it was found that the presence of a very small amount of a high melting point fraction can be detected by the type of initial curve in cooling curve as measured under the previously described condition. That is, it was found that tempering procedure is easy if $\theta$p is 19° C. or below. A preferable cooling curve is such that it has an initial curve identical to the initial curve of a liquid oil down to 17° C. That is, in FIG. 2, the temperature of point P, namely, $\theta$p is 17° C. or below. In the process of chocolate production, a tempering step is the most important step which determines the quality of chocolate. If the tempering step is not smooth, fat blooming appears easily with the value of chocolate as a commodity completely lost.

The cacao butter substitutes of the present invention can be produced by using palm oil as a starting material and by subjecting it to a special fractionation step. In the cacao butter substitutes of the present invention, the ratio P/S of palmitic acid groups (P) to saturated fatty acid groups (S) is approximately 80 to 92%.

Supplemental explanations will be made to the cacao butter substitutes of the present invention from the standpoint of triglyceride structure.

The cacao butter substitutes of the present invention comprises a medium melting point fraction of palm oil. Accordingly, in these cacao butter substitutes, the ratio of palmitic acid group to saturated fatty acid groups is larger than in the conventional similar structure type substitutes. This gives rise to a melting characteristic as possessed by laurin type substitutes of good quality but not possessed by the hitherto known similar structure type substitutes. When the ratio of palmitic acid group is in such a range as in the cacao butter substitutes of the present invention, the amounts of 1,3-dipalmito-2-olein (POP) and 1,3-dipalmito-2-linolein (PLP) inevitably become very large compared with those in the hitherto known similar structure type substitutes (The total amount of POP and PLP becomes about 60% or more, in which POP occupies about 90%). For many years, the present inventors have continued studies on the similar structure type substitutes. In the course of these studies, there was investigated compatibility between cacao fat and various 1,3-disaturated -2-unsaturated triglycerides (SUS) such as POP, POSt [1-(3-)palmito-2-oleo-3(1-)stearin], StOSt [1,3-distearo-2-olein], POA [1-(3-)palmito-2-oleo-3(1-)arachin] and StOA [1-(3-)stearo-2-oleo-3-(1-)-arachin]. As a result, it was found that POP has poorer compatibility with cacao fat than other SUSs (Japanese Patent Post-Examination Publication No. 37768/1981 or U.S. Pat. No. 4,199,611 by ASAHI DENKA KOGYO K.K.).

Accordingly, the present inventors had known that the similar structure type substitute containing a large amount of POP makes tempering very difficult. Also, it had been a known fact in the above mentioned Japanese Patnet Publication that the similar structure type substitute having a good tempering property can be obtained by adding to POP appropriate amounts of POSt, StOSt, POA, SOA, etc. to reduce the content of POP to 20% or less. Based on belief that POP having a more sharply melting characteristic similarly to laurin type substitutes than other SUSs can be used as a cacao butter substitute only if the tempering property of POP is improved, the present inventors made extensive studies. As a result, it has been found that a composition containing a large amount of POP can become the similar structure type substitute of good tempering property if the composition is freed of a high melting point fraction as much as possible.

When a palm medium melting point fraction (PMF) of hitherto known type is used as a single cacao butter substitute, the proportion of PMF as a cacao butter substitute relative to the total amount of cacao fat and cacao butter substitute in chocolate has hitherto been up to about 30%. If the hitherto known type PMF is used in an amount of more than 30% or more than 50%, tempering becomes very difficult. Specifically, even if such a chocolate composition has a viscosity range suitable for a tempering machine, tempering can not be conducted satisfactorily and, even if a more appropriate tempering condition is adopted, there occurs a sudden viscosity increase resulting in inability of pouring into a mold. Further, even if a chocolate composition is poured into a mold and made into a chcolate, fat blooming appears easily owing to inappropriate tempering, with the value of chocolate as a commodity completely lost, In addition, a chocolate containing a large amount of PMF of hitherto known type has a poor snapping property and also inferior heat resistance. These drawbacks are due to poor compatibility between PMF of hitherto known type and cacao fat.

Chocolate containing a cacao butter substitute of the present invention have a good snapping property and a sharply melting characteristic. Further, these chocolates have a good tempering property. In order for chocolates to exhibit the characteristics of the cacao butter substitute of the present invention as effectively as possible, it is necessary that the proportion of said cacao buttter substitute relative to the total amount of cacao fat and cacao butter substitute in chocolate be made larger. When the proportion of cacao butter substitute is 60% by weight or more, the characteristics of cacao butter substitute are exhibited. When the proportion is 70% by weight or more, the characteristics are exhibited more effectively. Thus, there can be produced a chocolate having a sharply melting characteristic which conventional chocolates do not possess.

In production of the cacao butter substitute of the present invention, a step of solvent fractionation is requisite. Processes for producing a palm medium melting point fraction (PMF), as a raw material for similar structure type substitutes by subjecting palm oil or a palm soft oil to a solvent fractionation step, are disclosed in Japanese Patent Post-Examination Publication No. 39005/1979 (ASAHI DENKA KOGYO K.K.), Japanese Laid-open Patent Application No. 84009/1978 (Fuji Oil Co. Ltd.), etc. These fractionation processes are for production of a PMF to be used as one raw material of the hitherto known similar structure type substitutes but are not suitable for production of the cacao butter substitute of the present invention. That is, the process disclosed in the above Japanese Patent Publication No. 39005/1979 is characterized by having a very high production efficiency and being an energy-saving process. However, a resulting PMF contains a high melting point fraction. Consequently, the PMF can not be used as a cacao butter substitute by itself. Also, a chocolate containing the PMF in an large amount can not be tempered satisfactorily. In the process for palm oil fractionation disclosed in the above Japanese Laid-open Patent Application No. 84009/1978, a palm oil previously freed or not freed of its high melting point fraction is firstly freed of a low melting point fraction amounting to at about 30% by weight relative to material palm oil and then the remainder is subjected to two stage fractionation (in the first stage, a high melting point fraction is collected as a crystal and, in the second stage, a medium melting point fraction (PMF) is collected as a crystal) to obtain a PMF having an iodine value of 36 or below, a rising melting point of 29.5° C. to 32.5° C. and a transparent point of 35.5° C. or below. This process is said to enable production of a PMF containing a small amount of a high melting point fraction. However, this PMF is not suitable as a cacao butter substitute of the present invention, either. Indeed, the PMF produced in Example of Japanese Laid-open Patent Application 84009/1978 has a solid fat content of more than 0% at 35° C. In the Example, the solid fat content of the PMF at 33° C. is not shown. However, estimating from the solid fat content at 25° C., etc., the solid fat content at 33° C. will be 4% or more. Accordingly, the PMF differs from the cacao butter substitute of the present invention.

In one process for producing the cacao butter substitute of the the present invention from palm oil or a palm soft oil (palm oil minus its high meling point fraction), at first a hitherto known PMF is produced and then it is subjected to repeated steps of solvent fractionation. The hitherto known PMF is produced, as in the above mentioned Japanese Patent Post-Examination Publication No. 39005/1979, Japanese Laid-open Patent Application No. 84009/1978, etc., by a process repuiring solvent fractionation. The solvent used in solvent fractionation ordinarily is n-hexane, methyl ethyl ketone, acetone or the like and, in Japan, particularly n-hexane is generally used. When the hitherto known PMF is produced from palm oil, as in Japanese Patent Post-Examination Publication No. 39005/1979, firstly a high melting point fraction is removed as a crystal and then a medium melting point fraction (PMF) is obtained as a crystal. Or, as in Japanese Laid-open Patent Application No. 84009/1978, a high melting point fraction and a medium melting point fraction are collected together as a crystal to remove a low melting point fraction and, in the subsequent fractionation step, the high melting point fraction is removed as a crystal to collect the medium melting point fraction and a residual low melting point fraction as a filtrate and the filtrate is subjected to solvent fractionation to obtain the medium melting point fraction (PMF) as a crystal.

By one of the above two processes or other similar process, there is obtained a PMF wherein the medium melting point fraction is concentrated to a certain level. By removing from the PMF a residual high melting point fraction as a crystal, there is obtained the cacao butter substitute of the present invention as a filtrate. As necessary, this filtrate subjected to solvent fractionation to obtain the cacao butter substitute of the present invention as a crystal.

In another method for producing the cacao butter substitute of the present invention, a hitherto known PMF is subjected to solvent fractionation to remove a residual low melting point fraction as a filtrate and then the resulting crystal is again subjected to solvent fractionation to remove a high melting point fraction as a crystal and obtain the cacao butter substitute of the present invention as a filtrate.

Thus, by a process requiring a solvent fractionation step wherein a hitherto known PMA is freed of a residual high melting point fraction, there can be obtained a fraction as the cacao butter substitute of the present invention which has a solid fat content of 70% or more at 20° C., 10% or more at 30° C., 1% or less at 33° C. and 0% at 35° C. and further shows an initial curve in cooling curve identical to the initial curve of a liquid oil down to 19° C. In freeing a hitherto known PMF of its high melting point fraction by solvent fractionation, it is desirable that about 8 to 20% relative to PMF be removed as a crystal. When further a low melting point fraction is removed as necessary, it is desirable that about 10 to 20% relative to PMF be removed as a filtrate.

In any fractionation process, by employing a step for removal of high melting point fraction at the final step of fractionation, a high melting point fraction can be removed more thoroughly, whereby a more desirable cacao butter substitute of the present invention can be obtained. As the solvent used in fractionation for removing a small amount of a high melting point fraction, n-hexane is desirable because it crystallizes the high melting point fraction more selectively.

Also, when a palm soft oil is used as a starting material, the cacao butter substitute of the present invention can be produced by a process similar to that employed when palm oil is used as a starting material.

In the cacao butter substitutes of the present invention produced from palm oil or a palm soft oil according to the above processes, saturated fatty acid groups consist substantially of palmitic acid group and stearic acid group; the proportion of palmitic acid group in saturated fatty acid groups is about 80 to 92%; unsaturated fatty acid groups consist substantially of oleic acid group and linoleic acid group; the proportion of oleic acid group in unsaturated fatty acid groups is 84 to 95%; the solid fat content is about 80 to 92% at 10° C., 70 to 87% at 20° C., 60 to 72% at 25° C., 10 to 30% at 30° C., 0 to 1% at 33° C. and 0% at 35° C.; and $\theta p$ in cooling curve is 15° C. to 19° C.

The palm medium melting point fraction of the present invention may be used as a cacao butter substitute by itself. By adding thereto at least one oil or fat selected from illippe butter, mango fat, sal butter, kokum butter, mowrah oil, shea fat and their fractions, there can be obtained a cacao butter substitute having a further improved tempering property and a sharply melting characteristic. Preferable of the above mentioned oils and fats are mango fat, sal butter, mowrah oil, shea fat, their stearin fractions and their medium melting point fractions. It is desirable that these oils and fats contain high melting point components such as trisaturated glycerides (SSS) in an amount as small as possible. It is desirable that these oils and fats be used so as not to exceed 40% by weight and preferably so as not to exceed 35% by weight in the cacao butter substitutes of the present invention. Meanwhile, in order to exhibit their addition effects, the oils and fats are required to be present by at least 5% by weight and preferably at least 10% by weight in the cacao butter substitutes of the present invention.

The solid fat content in the cacao butter substitutes of the present invention containing the above oils and fats is 77 to 92% at 10° C., 70 to 87% at 20° C., 55 to 72% at 25° C., 10 to 35% at 30° C., 0 to 5% at 33° C. and 1% or less at 35° C.

Hereinunder, examples of the present invention will be illustrated to explain the present invention in more detail.

EXAMPLE 1 AND COMPARATIVE EXAMPLE 1

1 Part (part by weight; hereinunder all parts have the same definition) of a palm oil of 53.4 iodine value subjected to acid removal by alkali and bleaching was mixed with 0.1 part of n-hexane. The mixture was kept at 42° C. to obtain a uniform miscella solution. The miscella solution was cooled down to 20° C. Thereto was added 0.3 part of n-hexane previously cooled to 15° C. They were stirred for 15 min. and left standing. Then, they were filtered to separate the resulting crystal and the liquid portion. The crystal was washed with 0.3 part of n-hexane of 15° C. The washing was combined with the filtrate and the solvent in the combined solution was distilled off. The solvent in the crystal was also distilled off. The yield of the crystal portion (C) was 12.5% (% by weight; hereinunder all % have the same definition), and the yield of the filtrate portion (F) was 87.5%.

1 Part of the filtrate portion (F) was mixed with 2.5 parts of n-hexane, and the mixture was kept at 40° C. to obtain a uniform miscella solution. The miscella solution was cooled down to −10° C. Thereto was added 0.7 part of n-hexane previously cooled to −15° C., and they were stirred. Then, the resulting crystal and the liquid portion were separated by filtration. The crystal was washed with 2 parts of n-hexane of −15° C. The solvent was distilled off from the crystal and the filtrate. The yield of the crystal portion (CF) was 28.7% and the yield of the filtrate portion (FF) was 71.3%. The crystal portion (CF) had an iodine value of 35.0. Here, the crystal portion is a fraction corresponding to the hitherto known PMF and is used as Comparative Example 1.

1 Part of the crystal portion (CF) was mixed with 1.2 parts of n-hexane. The mixture was kept at 40° C. to obtain a uniform miscella solution. The miscella solution was cooled down to 7.5° C. and filtered to separate the resulting crystal and the liquid portion. The crystal was washed with 1 part of n-hexane of 3° C. The solvent was distilled off from the crystal, the filtrate and the washings to obtain 8.5% of the crystal portion (CCF), 84.0% of the filtrate portion (FCF) and 7.5% of the washings portion (WCF), respectively. The crystal portion (CCF), the filtrate portion (FCF) and the washings portion (WCF) had iodine values of 17.2, 36.4 and 35.8, respectively. This filtrate portion (FCF) is a cacao butter substitute according to the present invention and is used as Example 1.

Figure 3:
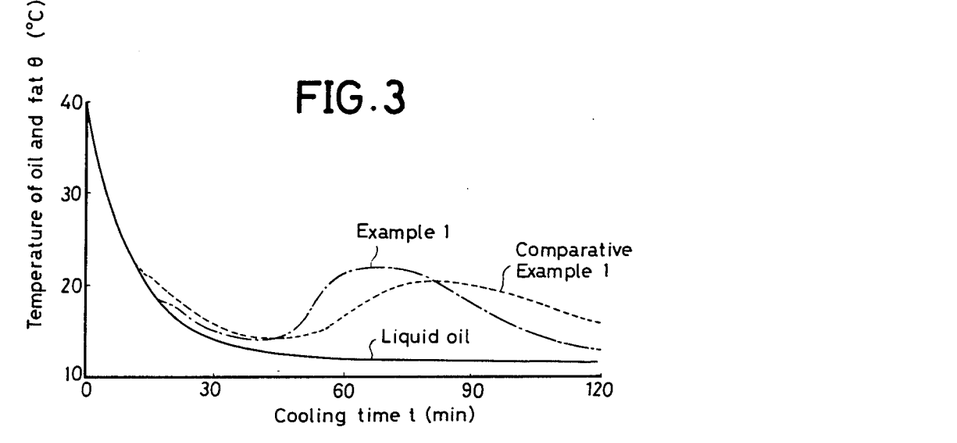
FIG. 3 is a graph of cooling curves in Example 1 of the present invention and Comparative Example 1.

The solid fat contents and the cooling curves of Example 1 and comparative Example 1 are shown in Table 1 and FIG. 3.

EXAMPLE 2 AND COMPARATIVE EXAMPLE 2

1 Part of a palm oil (iodine value 53.4) subjected to acid removal by alkali and bleaching was mixed with 4 parts of n-hexane. They were kept at 40° C. to obtain a uniform miscella solution. The miscella solution was cooled down to −17° C. and kept at this temperature for 60 min. with stirring. Filtration and solvent distillation were conducted in this order to obtain 63.6% of a crystal portion (C) and 36.4% of a filtrate portion (F).

1 Part of the crystal portion (C) was mixed with 4 parts of n-hexane. They were kept at 40° C. to obtain a uniform miscella solution. The miscella solution was cooled to 1° C. and kept at this temperature for 30 min. with stirring. Then, the crystal and the filtrate were separated by filtration. The crystal was washed with 0.3 part of n-hexane of −5° C. The washing was combined into the filtrate. The crystal and the filtrate were subjected to solvent removal by distillation separately to obtain 21.3% of a crystal portion (CC) and 78.7% of a filtrate portion (FC), respectively.

1 Part of the filtrate portion (FC) was mixed with 5 parts of n-hexane. They were kept at 40° C. to obtain a uniform miscella solution. The miscella solution was cooled to −15° C. and kept at that temperature for 30 min. with stirring. Then, filtration was conducted to obtain a crystal and a filtrate. The crystal was washed with 2 parts of n-hexane of −20° C. The washing was combined into the filtrate. The crystal and the filtrate were subjected to solvent removal by distillation separately to obtain 51.1% of a crystal portion (CFC) and 48.9% of a filtrate portion (FFC), respectively. The crystal portion (CFC) had an iodine value of 33.5. This crystal portion (CFC) is used as Comparative Example 2.

1 Part of the crystal portion (CFC) was mixed with 1.2 parts of n-hexane. They were kept at 40° C. to obtain a uniform miscella solution. The miscella solution was cooled to 7.5° C. and filtered to obtain a crystal and a filtrate. The crystal was washed with 1 part of n-hexane of 3° C. The crystal, the filtrate and the washings were subjected to solvent removal by distillation separately to obtain 7.8% of a crystal portion (CCFC), 85.6% of a filtrate portion (FCFC) and 6.6% of a washings portion (WCFC), respectively. The crystal portion (CCFC), the filtrate portion (FCFC) and the washings portion (WCFC) had iodine values of 11.3, 35.5 and 35.0, respectively. This filtration portion (FCFC) is a cacao butter substitute of the present invention and is used as Example 2.

Figure 4:
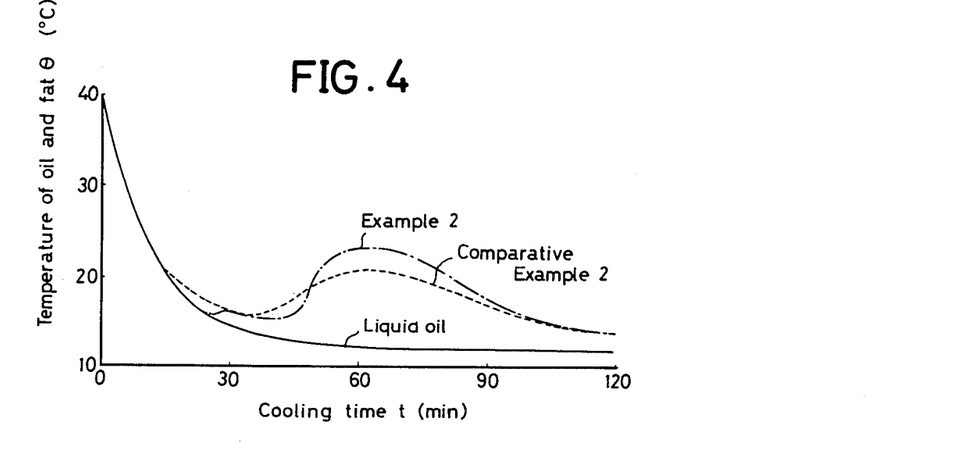
FIG. 4 is a graph showing cooling curves in Example 2 of the present invention and Comparative Example 2.

The solid fat contents and the cooling curves of Example 2 and Comparative Example 2 are shown in Table 1 and FIG. 4.

EXAMPLE 3 AND COMPARATIVE EXAMPLE 3

1 Part of palm olein imported from Malaysia (iodine value 57.4; a soft palm oil produced by wintering) was mixed with 1 part of n-hexane. They were kept at 40° C. to obtain a uniform miscella solution. The miscella solution was cooled to −9° C. Thereto was added 0.7 part of n-hexane previously cooled to −13° C. and they were stirred. Filtration was conducted to obtain a crystal and a filtrate. The crystal was washed with 2 parts of n-hexane of −13° C. The crystal and the filtrate were subjected to solvent removal by distillation separately to obtain 41.5% of a crystal portion (CF) and 58.5% of a filtrate portion (FF). The crystal portion (CF) had an iodine value of 42.8.

1 Part of the crystal portion (CF) was mixed with 2 parts of n-hexane to obtain a uniform miscella solution. The miscella solution was cooled to −10° C. and filtered to obtain a crystal and a filtrate. The crystal was washed with 2 parts of n-hexane previously cooled to −13° C. The crystal and the filtrate were subjected to solvent removal by distillation separately. The crystal portion (CCF) obtained had a yield of 45.2% and an iodine value of 33.6. This crystal portion (CCF) is a fraction corresponding to the hitherto known PMF and is used as Comparative Example 3.

1 Part of the crystal portion (CCF) was mixed with 1.2 parts of n-hexane to obtain a uniform solution. The solution was cooled to 7° C. and filtered to obtain a crystal and a filtrate. The crystal was washed with 1 part of n-hexane of 3° C. The crystal, the filtrate and the washings were separately subjected to solvent removal by distillation to obtain 10.2% of a crystal porttion (CCCF), 82.1% of a filtrate portion (FCCF) and 7.7% of a washings portion (WCCF), respectively. The crystal portion (CCCF), the filtrate portion (FCCF) and the washings portion (WCCF) had iodine values of 13.5, 36.2 and 33.2, respectively. This filtrate portion (FCCF) is a cacao butter substitute of the present invention and is used as Example 3.

Figure 5:
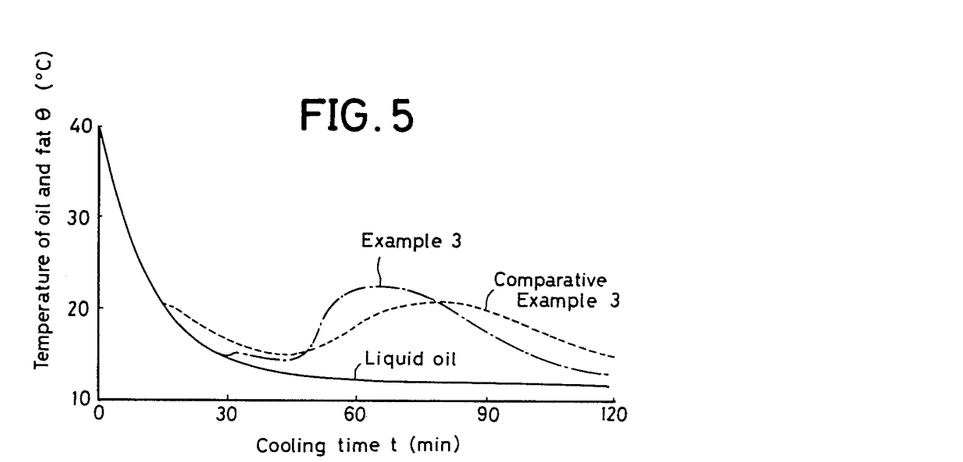
FIG. 5 is a graph showing cooling curves in Example 3 of the present invention and Comparative Example 3.

The solid fat contents and the cooling curves of Example 3 and Comparative Example 3 are shown in Table 1 and FIG. 5.

EXAMPLE 4

70 Parts of the FCF obtained in Example 1 was mixed with 30 parts of refined kokum butter to produce a cacao butter substitute. The solid fat content of this cacao butter substitute is shown in Table 2.

EXAMPLE 5

70 Parts of the FCFC obtained in Example 2 was mixed with 30 parts of refined illippe butter to produce a cacao butter substitute. The solid fat content of this cacao butter substitute is shown in Table 2.

EXAMPLE 6

70 Parts of the FCCF obtained in Example 3 was mixed with 30 parts of refined sal butter to produce a cacao butter substitute. The solid fat content of this cacao butter substitute is shown in Table 2.

EXAMPLE 7

90 Parts of the FCCF obtained in Example 3 was mixed with 10 parts of refined mango fat to produce a cacao butter substitute. The solid fat content of this cacao butter substitute is shown in Table 2.

EXAMPLE 8

80 Parts of the FCCF obtained in Example 3 were mixed with 20 parts of a mowrah medium melting point fraction to produce a cacao butter substitute. The solid fat content of this cacao butter substitute is shown in Table 2.

The mowrah medium melting point fraction was prepared as follows according to solvent fractionation.

1 Part of refined mowrah oil was dissolved in 3.5 parts of acetone. The solution was cooled down to 25° C. and kept at that temperature for 1 hr. The resulting crystal portion was removed by filtration. The filtrate portion was further cooled to 0° C. and kept at that temperature for 1 hr. It was filtered to obtain a crystal portion and filtrate portion. 1 Part of this crystal portion was dissolved in 3.5 parts of acetone. The solution was cooled to 5° C. and kept at that temperature for 1 hr. It was filtered to obtain a crystal portion and a filtrate portion. This crystal portion is the above mowrah medium melting point fraction. Its yield was 26.8% relative to the refined mowrah oil and its iodine value was 38.5.

EXAMPLE 9

90 Parts of the FCCF obtained in Example 3 was mixed with 10 parts of shea stearin to produce a cacao butter substitute. The solid fat content of this cacao butter substitute is shown in Table 9.

The above shea stearin was prepared as follows.

1 Part of refined shea fat was mixed with 3 parts of acetone, and they were left standing at room temperature to form and precipitate a gum-like substance and a crystal of high melting point fraction. The supernatant was obtained by decantation. The solvent was distilled off from the supernatant to obtain a gum-removed shea fat. 1 Part of the gum-removed shea fat was dissolved in 4 parts of hexane. The solution was cooled to $-7°$ C. and kept at that temperature for 30 min. Then, it was filtered to obtain a crystal portion and a filtrate portion. The crystal portion was washed with 2 parts of hexane of $-12°$ C. The yield of the crystal portion, namely, shea stearin was 37% relative to the gum-removed shea fat, and the iodine value of the shea stearin was 33.5.

EXAMPLE 10

A mixture consisting of 60% by weight of a stearin fraction of sal butter and 40% by weight of kokum butter was mixed with the FCCF of Example 3, in various proportions, whereby various mixed oils were produced. The solid fat contents of these mixed oils were measured at 20° C., 30° C., 33° C. and 35° C. The results are shown in FIG. 6.

Figure 6:
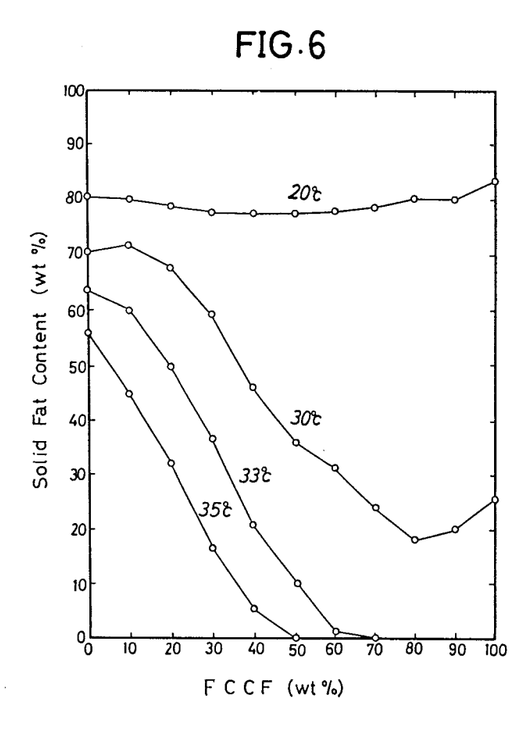
FIG. 6 is a graph showing solid fat contents of cacao butter substitutes of Example 10 containing the FCCF of Example 3.

The abscissa of FIG. 6 represents the proportion of the FCCF. The physical properties of these mixed oils change rapidly at a FCCF proportion of about 60% by weight. The solid fat contents at 33° C. are 1% at a FCCF proportion of 60% by weight and 0% at FCCF proportions of 70% by weight and more.

COMPARATIVE EXAMPLE 4

In a manner similar to that in Example 10, a mixture consisting of 60% by weight of a stearin fraction of sal butter and 40% by weight of kokum butter was mixed with the CCF of Comparative Example 3 in various proportions, whereby various mixed oils were produced. The solid fat contents of these mixed oils were measured. The results are shown in FIG. 7.

Figure 7:
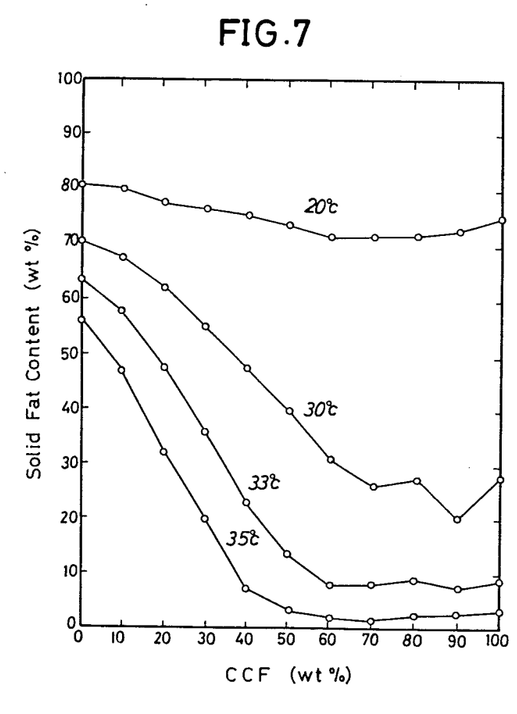
FIG. 7 is a graph showing solid fat contents of cacao butter substitutes of Comparative Example 4 containing the CCF.

As is obvious from the comparison of FIG. 7 with FIG. 6, the mixed oils containing the CCF have much higher solid fat contents at temperatures of 33° C. or higher than the mixed oils containing the FCCF of Example 3.

TEST FOR CHOCOLATE PRODUCTION AND EVALUATION FOR PRODUCED CHOCOLATES

Oils and fats obtained in Examples and Comparative Examples were subjected to tests for chocolate production wherein each of the oils and fats was used as a cacao butter substitute, and the chocolates produced in the tests were evaluated.

Chocolate blending was conducted in accordance with the three formulations shown in Table 3.

Tempering and molding were conducted as follows. 400 Grams of a chocolate paste was weighed in a stainless steel kettle of 100 mm inside diameter and 80 mm height. A flat blade of 90 mm diameter, 18 mm height and 1 mm thickness was fixed to a stirrer equipped with a torque meter (mode LR-41B, manufactured by Yamato Kagaku). The lower end of the blade was positioned so as to be 5 mm above the bottom of the kettle and the stirrer was rotated at 60 rpm. The chocolate temperature of 40° C. to 45° C. was cooled to 24° C. with water. When the chocolate temperature became 24° C., the cooling was stopped and the temperature was maintained. When the chocolate viscosity increased, hot water of 28° C. to 30° C. was passed, whereby the chocolate viscosity was reduced and the chocolate temperature was kept at 27° C. to 29° C. for 15 min. Then, the chocolate was transferred into a mold of 70 mm×30 mm×10 mm and cooled to 7° C. to 8° C.

Chocolate evaluation was made after aging of 10 days at 20° C.

Results of tests for chocolate production in A, B and C formulations as well as results of evaluation for produced chocolates are shown in Tables 4 to 9. Teeth-feel in these tables is for evaluation of snapping property of chocolate, and it is dependent upon the physical properties of cacao butter substitute used in chocolate and also upon the tempering condition of chocolate. Mouth melting and refreshingness in the tables represent a feeling given by a chocolate when the chocolate melts in the mouth. Refreshingness has a connection with teeth-feel, namely, snapping property, and accordingly a chocolate of good mouth melting but having no snapping property tends to have no refreshingness. Evaluations of these items were made by ten examiners.

As is abvious from these tables, when cacao butter substitutes according to the present invention are used in chocolates, there are obtained chocolates which have a very good tempering property and satisfactory releasability and are good to excellent in snapping property, mouth melting and refreshingness. The characteristics of snapping and sharp melting as possessed by the chocolates of the present invention have not existed in conventional chocolates. Conventional chocolates have satisfactory snapping property but no sharp melting chracteristic.

TABLE 1

Solid fat contents and θ x of cooling curves, of Examples 1 to 3 and Comparative Examples 1 to 3

| | sample symbol | Solid fat content | | | | | | Cooling Curve | | | | | |
|---|---|---|---|---|---|---|---|---|---|---|---|---|---|
| | | 20° C. | 30° C. | 33° C. | 35° C. | 37° C. | 40° C. | θ p | θ q | θ r | θ s | θ t | Δ θ st |
| Example 1 | FCF | 71.4 | 12.5 | 0.5 | 0.0 | 0.0 | 0.0 | 18.4 | * 18.1 | * 18.1 | 14.1 | 22.0 | 7.9 |
| Comparative Example 1 | CF | 76.9 | 26.2 | 13.7 | 2.6 | 0.5 | 0.0 | 22.8 | * 21.0 | * 21.0 | 14.3 | 20.5 | 6.2 |
| Example 2 | FCFC | 79.8 | 23.0 | 0.0 | 0.0 | 0.0 | 0.0 | 16.5 | 16.0 | 16.4 | 15.4 | 23.3 | 7.9 |
| Comparative Example 2 | CFC | 75.2 | 31.2 | 6.2 | 1.0 | 0.0 | 0.0 | 21.9 | ** (16.0) | ** (21.0) | 16.0 | 21.0 | 5.0 |
| Example 3 | FCCF | 83.4 | 25.4 | 0.0 | 0.0 | 0.0 | 0.0 | 15.5 | 15.0 | 15.3 | 14.4 | 22.5 | 8.1 |
| Comparative Example 3 | CCF | 74.9 | 27.9 | 8.9 | 3.5 | 1.3 | 0.0 | 21.1 | * 20.3 | * 20.3 | 15.0 | 20.7 | 5.7 |

*Point Q and point R are regarded to be identical.
**Point Q and point S are regarded to be identical. Further, point R and Point T are regarded to be identical.

TABLE 2

Solid fat contents of cacao butter substitutes

| | 20° C. | 30° C. | 33° C. | 35° C. |
|---|---|---|---|---|
| Example 4 | 72.6 | 15.6 | 0.0 | 0.0 |
| Example 5 | 75.5 | 24.2 | 0.2 | 0.0 |
| Example 6 | 70.0 | 25.8 | 0.0 | 0.0 |
| Example 7 | 80.4 | 24.8 | 0.4 | 0.0 |
| Example 8 | 80.1 | 25.0 | 0.0 | 0.0 |
| Example 9 | 80.0 | 23.5 | 0.0 | 0.0 |

TABLE 3

Chocalate formulations

| Component | Formulation | | |
|---|---|---|---|
| | A | B | C |
| Sugar | 50 parts | 50 parts | 50 parts |
| Powdered skim milk | 10 parts | 10 parts | 10 parts |
| Cacao mass | 10 parts | 10 parts | 10 parts |
| Cacao fat | — | 8 parts | 15 parts |
| Cacao butter substitute | 30 parts | 22 parts | 15 parts |
| Lecithin | 0.4 parts | 0.4 parts | 0.4 parts |
| Vanillin | Required amount | | |
| Total oil content | 35.5% | 35.5% | 35.5% |
| Cacao fat | 5.5 (about 15%) | 13.5 (about 38%) | 20.5 (about 58%) |
| Cacao butter substitute | 30.0 (about 85%) | 22.0 (about 62%) | 15.0 (about 42%) |

TABLE 4

Tests for chocolate production in formulation A and evaluation for produced chocolates

| | Tempering | | Releasability | | | Evaluation of tempering | | |
|---|---|---|---|---|---|---|---|---|
| | Torque value during tempering (kg · cm) | Moldability | 15 min. cooling | 25 min. cooling | Evaluation of tempering | Teeth feel | Mouth melting | Refreshingness |
| Example 1 | 0.54 | Easy | 10% | 90% | ⊚ | O | ⊚ | ⊚ |
| Example 2 | 0.48 | Easy | 20% | 90% | ⊚ | ⊚ | ⊚ | ⊚ |
| Example 3 | 0.50 | Easy | 30% | 100% | ⊚ | ⊚ | ⊚ | ⊚ |
| Comparative Example 1 | 1.88 | Very difficult due to high viscosity | 0% | 0% | XX | X | Δ | Δ |
| Comparative Example 2 | 1.56 | Same as above | 0% | 0% | XX | X | Δ | Δ |
| Comparative Example 3 | 1.78 | Same as above | 0% | 0% | XX | X | Δ | Δ |

⊚ Very good,
O Good,
Δ Poor,
X Considerably poor,
XX Extremely poor

TABLE 5

Tests for chocolate production in formulation B and evaluation for produced chocolates

| | Tempering | | Releasability | | | Evaluation of tempering | | |
|---|---|---|---|---|---|---|---|---|
| | Torque value during tempering (kg · cm) | Moldability | 15 min. cooling | 25 min. cooling | Evaluation of tempering | Teeth feel | Mouth melting | Refreshingness |
| Example 1 | 0.62 | Easy | 40% | 100% | ⊚ | O | ⊚ | O |
| Example 2 | 0.54 | Easy | 40% | 100% | ⊚ | ⊚ | ⊚ | ⊚ |

TABLE 5-continued

Tests for chocolate production in formulation B and evaluation for produced chocolates

|  | Tempering | | Releasability | | | Evaluation of tempering | | |
|---|---|---|---|---|---|---|---|---|
|  | Torque value during tempering (kg · cm) | Moldability | 15 min. cooling | 25 min. cooling | Evaluation of tempering | Teeth feel | Mouth melting | Refreshingness |
| Example 3 | 0.56 | Easy | 60% | 100% | ⊚ | ⊚ | ⊚ | ⊚ |
| Comparative Example 1 | 1.48 | Very difficult due to high viscosity | 0% | 0% | XX | X | Δ | Δ |
| Comparative Example 2 | 1.08 | Slightly difficult | 0% | 30% | Δ | Δ | Δ | Δ |
| Comparative Example 3 | 1.26 | Difficult | 0% | 10% | X | Δ | Δ | Δ |

⊚ Very Good,
○ Good,
Δ Poor,
X Considerably poor,
XX Extremely poor

TABLE 6

Tests for chocolate production in formulation C and evaluation for produced chocolates

|  | Tempering | | Releasability | | | Evaluation of tempering | | |
|---|---|---|---|---|---|---|---|---|
|  | Torque value during tempering (kg · cm) | Moldability | 15 min. cooling | 25 min. cooling | Evaluation of tempering | Teeth feel | Mouth melting | Refreshingness |
| Example 1 | 0.64 | Easy | 60% | 100% | ⊚ | ○ | ○ | ○ |
| Example 2 | 0.58 | Easy | 60% | 100% | ⊚ | ⊚ | ○ | ○ |
| Example 3 | 0.58 | Easy | 70% | 100% | ⊚ | ⊚ | ○ | ○ |
| Comparative Example 1 | 1.06 | Slightly difficult | 0% | 30% | Δ | ○ | Δ | Δ |
| Comparative Example 2 | 0.80 | Slightly easy | 20% | 60% | ○ | ○ | Δ | Δ |
| Comparative Example 3 | 0.98 | Slightly easy | 10% | 60% | ○ | ○ | Δ | Δ |

⊚ Very good,
○ Good,
Δ Poor,
X Considerably poor,
XX Extremely poor

TABLE 7

Tests for chocolate production in formulation A and evaluation for produced chocolates

|  | Tempering | | Releasability | | | Evaluation of tempering | | |
|---|---|---|---|---|---|---|---|---|
|  | Torque value during tempering (kg · cm) | Moldability | 15 min. cooling | 25 min. cooling | Evaluation of tempering | Teeth feel | Mouth melting | Refreshingness |
| Example 4 | 0.50 | Very easy | 70% | 100% | ⊚ | ⊚ | ⊚ | ⊚ |
| Example 5 | 0.54 | Very easy | 70% | 100% | ⊚ | ⊚ | ⊚ | ⊚ |
| Example 6 | 0.48 | Very easy | 60% | 100% | ⊚ | ⊚ | ⊚ | ⊚ |
| Example 7 | 0.50 | Very easy | 50% | 100% | ⊚ | ⊚ | ⊚ | ⊚ |
| Example 8 | 0.49 | Very easy | 70% | 100% | ⊚ | ⊚ | ⊚ | ⊚ |
| Example 9 | 0.54 | Very easy | 70% | 100% | ⊚ | ⊚ | ⊚ | ⊚ |

⊚ Very good,
○ Good,
Δ Poor,
X Considerably poor,
XX Extremely poor

TABLE 8

Tests for chocolate production in formulation A and evaluation for produced chocolates

| Cacao butter substitute | Proportion of FCCF | Tempering Torque value during tempering (kg·cm) | Moldability | Releasability 15 min. cooling | Releasability 25 min. cooling | Evaluation of tempering | Evaluation of tempering Teeth feel | Evaluation of tempering Mouth melting | Evaluation of tempering Refreshingness |
|---|---|---|---|---|---|---|---|---|---|
| Example 10 | 90% | 0.50 | Very easy | 50% | 100% | ⊚ | ⊚ | ⊚ | ⊚ |
| Example 10 | 80% | 0.48 | Very easy | 60% | 100% | ⊚ | ⊚ | ⊚ | ⊚ |
| Example 10 | 60% | 0.50 | Very easy | 70% | 100% | ⊚ | ⊚ | ⊚ | ⊚ |
| Example 10 | 40% | 0.62 | Easy | 80% | 100% | ⊚ | ⊚ | Δ | Δ |

⊚ Very good,
O Good,
Δ Poor,
X Considerably poor,
XX Extremely poor

TABLE 9

Tests for chocolate production in formulation A and evaluation for produced chocolates

| Cacao butter substitute | Proportion of CCF | Tempering Torque value during tempering (kg·cm) | Moldability | Releasability 15 min. cooling | Releasability 25 min. cooling | Evaluation of tempering | Evaluation of tempering Teeth feel | Evaluation of tempering Mouth melting | Evaluation of tempering Refreshingness |
|---|---|---|---|---|---|---|---|---|---|
| Comparative Example 4 | 90% | 1.52 | Very difficult due to high viscosity | 0% | 0% | XX | X | Δ | Δ |
| Comparative Example 4 | 80% | 1.30 | Difficult | 0% | 30% | Δ | Δ | O | Δ |
| Comparative Example 4 | 60% | 0.70 | Slightly easy | 20% | 90% | O | O | Δ | Δ |
| Comparative Example 4 | 40% | 0.90 | Slightly easy | 40% | 100% | ⊚ | ⊚ | X | X |

⊚ Very good,
O Good,
Δ Poor,
X Considerably poor,
XX Extremely poor

What is claimed is:

1. A cacao butter substitute comprising a medium melting point fraction of palm oil, characterized by having a solid fat content of 80% or more at 20° C., 20% or more at 30° C., 0% at 33° C. and 0% at 35° C., and showing an initial cooling curve which is identical down to 19° C. to the initial cooling curve of a liquid oil in which no crystals separate when the liquid oil is cooled under conditions of cooling curve measurement.

2. A cacao butter substitute according to claim 1, wherein the initial curve in cooling curve is identical down to 17° C. to the initial curve of a palm soft oil having an iodine value of 65 or above in which the medium melting point fraction and the high melting point fraction are removed.

3. A cacao butter substitute according to claim 1, further including at least one oil or fat selected from the group consisting of illippe butter, mango fat, sal butter, kokum butter, mowrah oil, shea fat and fractions thereof.

4. A cacao butter substitute according to claim 2, further including at least one oil and fat selected from the group consisting of illippe butter, mango fat, sal butter, kokum butter, mowrah oil, shea fat and fractions thereof.

5. A cacao butter substitute according to claim 3, wherein the content of said oil or fat in said substitute is 5 to 40% by weight.

6. A chocolate, comprising cacao fat; and a cacao butter substitute having a medium melting point fraction of palm oil, characterized by having a solid fat content of 80% or more at 20° C., 20% or more at 30° C., 0% at 33° C. and 0% at 35° C., and showing an initial curve in cooling curve which is identical down to 19° C. to the initial curve of a liquid oil in which no crystals separate when the liquid oil is cooled under conditions of cooling curve measurement.

7. A chocolate according to claim 6, wherein the content of said cacao butter substitute is at least 60% by weight of the total amount of cacao fat and cacao butter substitute in chocolate.

8. A chocolate according to claim 6, wherein the content of said cacao butter substitute is at least 70% by weight of the total amount of cacao fat and cacao butter substitute in chocolate.

* * * * *